United States Patent
Kang et al.

(10) Patent No.: US 7,576,823 B2
(45) Date of Patent: Aug. 18, 2009

(54) IN-PLANE SWITCHING MODE LIQUID CRYSTAL DISPLAY DEVICE

(75) Inventors: Byung Koo Kang, Gyeongsangbuk-Do (KR); Woon Sub Choi, Busan (KR)

(73) Assignee: LG Display Co., Ltd., Seoul (KR)

( * ) Notice: Subject to any disclaimer, the term of this patent is extended or adjusted under 35 U.S.C. 154(b) by 760 days.

(21) Appl. No.: 11/165,461

(22) Filed: Jun. 24, 2005

(65) Prior Publication Data
US 2006/0146252 A1 Jul. 6, 2006

(30) Foreign Application Priority Data
Dec. 30, 2004 (KR) .................. 10-2004-0117401

(51) Int. Cl.
*G02F 1/1343* (2006.01)

(52) U.S. Cl. ............... 349/141; 349/139; 349/126; 349/129

(58) Field of Classification Search .............. 349/141, 349/139, 123, 38, 143, 146, 126, 129
See application file for complete search history.

(56) References Cited

U.S. PATENT DOCUMENTS

| | | | | |
|---|---|---|---|---|
| 6,256,081 B1 * | 7/2001 | Lee et al. | ............. | 349/141 |
| 6,512,565 B1 * | 1/2003 | Lee et al. | ............. | 349/130 |
| 6,856,371 B2 * | 2/2005 | Kim et al. | ............. | 349/141 |
| 7,317,503 B2 * | 1/2008 | Lee et al. | ............. | 349/141 |
| 2006/0145990 A1 * | 7/2006 | Kim et al. | ............. | 345/94 |

* cited by examiner

*Primary Examiner*—Thoi V Duong
(74) *Attorney, Agent, or Firm*—McKenna Long & Aldridge LLP

(57) ABSTRACT

A liquid crystal display device including a gate line formed on a first substrate; first and second adjacent data lines crossing the gate line to form adjacent pixel regions in an extended direction of the gate line; only one pixel electrode line in parallel with the first data line in each of the pixel regions; a plurality of pixel electrodes formed to be protruded in the extended direction of the gate line from the pixel electrode line; a plurality of common electrodes alternately formed in parallel with the plurality of pixel electrodes and generating an in-plane electric field therebetween; and an alignment film having a rubbing direction perpendicular to the first data line.

18 Claims, 11 Drawing Sheets

FIG. 6A

| R | G | B | R | G | B | R | G | B | R | G | B |
|---|---|---|---|---|---|---|---|---|---|---|---|
| + | + | − | − | + | + | − | − | + | + | − | − |
| − | − | + | + | − | − | + | + | − | − | + | + |
| + | + | − | − | + | + | − | − | + | + | − | − |
| − | − | + | + | − | − | + | + | − | − | + | + |

ODD FRAME

FIG. 6B

| R | G | B | R | G | B | R | G | B | R | G | B |
|---|---|---|---|---|---|---|---|---|---|---|---|
| − | − | + | + | − | − | + | + | − | − | + | + |
| + | + | − | − | + | + | − | − | + | + | − | − |
| − | − | + | + | − | − | + | + | − | − | + | + |
| + | + | − | − | + | + | − | − | + | + | − | − |

EVEN FRAME

IN-PLANE SWITCHING MODE LIQUID CRYSTAL DISPLAY DEVICE

This application claims the benefit of Korean Patent Application No. 2004-117401 filed in Korea on Dec. 30, 2004, which is hereby incorporated by reference in its entirety.

BACKGROUND OF THE INVENTION

1. Field of the Invention

The present invention relates to a liquid crystal display device and, more particularly, to an in-plane switching mode liquid crystal display device.

2. Description of the Background Art

Recently, demand for light, thin, short, and small flat panel display devices has been increasing for use in various mobile electronic devices, such as mobile phones, PDAs, or notebook computers. Thus, research is active in areas related to flat panel display devices, such as Liquid Crystal Display (LCD) devices, Plasma Display Panel (PDP) devices, Field Emission Display (FED) devices, Vacuum Fluorescent Display (VFD) devices. Among these flat panel display devices, the LCD has taken the spotlight because it can be readily mass-produced, requires simple driving circuits, and provides high picture quality. An LCD device displays an image by controlling light using an electric field. The LCD device includes a liquid crystal panel on which pixels are arranged in a matrix, and a driving circuit for driving the liquid crystal panel.

In general, pixels on the liquid crystal panel are driven by an inversion driving method such as one of a frame inversion system, a line inversion system and a dot inversion system. Amongst the inversion driving methods, the frame inversion system inverts the polarity of a data signal supplied to pixels on the liquid crystal panel whenever a frame is changed. The line inversion system inverts the polarity of data signals supplied to corresponding pixels according to each gate line. The dot inversion system supplies a data signal with an opposite polarity to pixels adjacent horizontally and vertically, and inverts the polarity of data signals supplied to each pixel on the liquid crystal panel at each frame. Among the inversion driving systems, the dot inversion system provides an image with excellent picture quality compared with the frame and line inversion systems.

FIG. 1 is a plane view of an in-plane switching (IPS) mode LCD device according to the related art. As shown in FIG. 1, a gate line 1 and a data line 10 are arranged on a first substrate of a liquid crystal panel. The gate line 1 and the data line 10 cross each other to define a pixel region on the first substrate. A gate electrode 9, a semiconductor layer (not shown), and source/drain electrodes 13 and 15 are formed at the crossing of the gate line 1 and the data line 10, forming a switching device, for example, a thin film transistor (TFT).

A pixel electrode 3 and a common electrode 5 are alternately disposed at each pixel region of the liquid crystal panel to generate an in-plane, for example a horizontal electric field on the first substrate. The pixel electrode 3 receives a data signal from the source/drain electrodes 13 and 15 of the switching device TFT. The horizontal electric field is generated between the pixel electrode 3 and the common electrode 5. The gate electrode 9 and the source/drain electrodes 13 and 15 are electrically connected with the gate line 1 and the data line 10, respectively, to turn on the switching device TFT with a signal inputted through the gate line 1 and transfer a data signal applied through the data line 10 to the pixel electrode 3. As a result, the LCD displays an image by controlling the light transmittance of a liquid crystal layer with the electric field formed between the pixel electrode 3 and the common electrode 5 according to the data signal supplied to each pixel region. A color filter layer (not shown) is formed on a second substrate, and a liquid crystal layer is formed at a space between the first and second substrates.

In such an IPS mode LCD, because liquid crystal molecules of the liquid crystal layer are driven by the horizontal electric field, the viewing angle is increased compared to the conventional TN (Twisted Nematic) mode LCD. Specifically, a viewing angle of about 80°-85° in all directions (up/down and left/right direction) may be obtained.

The related art LCD device is generally driven by a frame frequency of 60Hz. In a system that requires low power consumption, such as a notebook computer, the frame frequency may be lowered to about 50-30 Hz. An LCD panel driving method has been proposed which uses a horizontal 2-dot inversion system and requires low power consumption.

However, in the conventional IPS mode LCD, because the data line 10 and the pixel electrode 3 are adjacently disposed in parallel, a signal interference is easily generated between the data line 10 and the pixel electrode 3, causing crosstalk and light leakage.

To solve the crosstalk and light leakage problems, an outermost common electrode 5' is disposed near the data line 10. The outermost common electrode 5' is larger than the other common electrode 5. However, such an electrode disposition structure degrades the aperture ratio of the LCD and distorts the electric field because a the signal interference from the data line cannot be effectively prevented.

FIGS. 2A and 2B are enlarged views of a portion 'I' of FIG. 1 illustrating a distortion of the related art liquid crystal array due to a signal interference according to a voltage variation on the data line. Referring to FIGS. 2A and 2B, a rubbing direction for inducing an initial arrangement of liquid crystal molecules has about 45° tilt with respect to the common electrodes 5 and 5' and the pixel electrode 3. A horizontal electric field generated when a voltage is applied to the common electrodes 5 and 5' and the pixel electrode 3 is perpendicular to the common electrodes 5 and 5' and the pixel electrode 3.

As shown in FIG. 2A, when a voltage of 8V is applied to the data line 10 and voltages of 5V and 8V are respectively applied to the common electrodes 5 and 5' and the pixel electrode 3, a director of liquid crystal molecules is determined in a first direction 30 by the horizontal electric field generated due to a voltage difference between the common electrodes 5 and 5' and the pixel electrode 3. As shown in FIG. 2B, if the voltage applied to the data line 10 changes from 8V to 10V, the electric field generated on the actual driving region of the liquid crystal molecules rotates from the first direction 30 to a second direction 35.

The voltage change on the data line distorts the direction of the electric field in the pixel region, thereby causing a change in the arrangement of liquid crystal molecules. As a result, although the same voltage is applied to the common electrodes and the pixel electrode, the perceived color changes on the display.

SUMMARY OF THE INVENTION

Accordingly, the present invention is directed to an in-plane switching mode liquid crystal display device that substantially obviates one or more of the problems due to limitations and disadvantages of the related art.

An object of the present invention is to provide an in-plane switching mode liquid crystal display device capable of preventing a degradation of picture quality due to signal interference of a data line.

Another object of the present invention is to provide an in-plane switching mode liquid crystal display device capable of enhancing picture quality of a liquid crystal panel.

To achieve these and other advantages and in accordance with the purpose of the present invention, as embodied and broadly described herein, a liquid crystal display device including a gate line formed on a first substrate; first and second adjacent data lines crossing the gate line to form adjacent pixel regions in an extended direction of the gate line; only one pixel electrode line in parallel with the first data line in each of the pixel regions; a plurality of pixel electrodes formed to be protruded in the extended direction of the gate line from the pixel electrode line; a plurality of common electrodes alternately formed in parallel with the plurality of pixel electrodes and generating an in-plane electric field therebetween; and an alignment film having a rubbing direction perpendicular to the first data line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 6A and 6B show schematic exemplary polarity patterns of a data signal supplied to a liquid crystal panel by a horizontal 2-dot inversion system;

DETAILED DESCRIPTION OF THE ILLUSTRATED EMBODIMENTS

An LCD device in accordance with the present invention will now be described with reference to the accompanying drawings.

Figure 1:
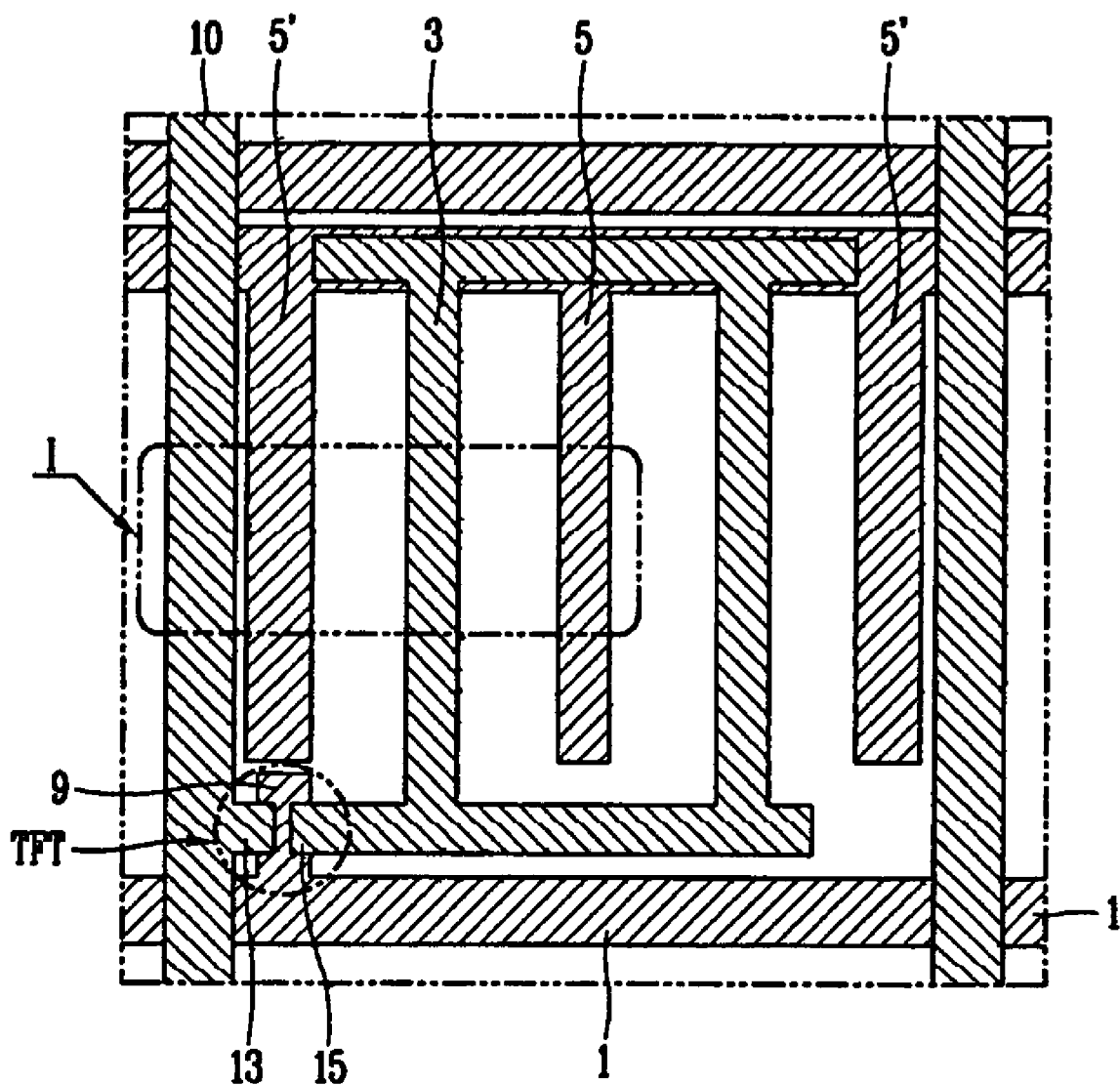
FIG. 1 is a plane view of an in-plane switching mode LCD device according to the related art.
Figure 2A:
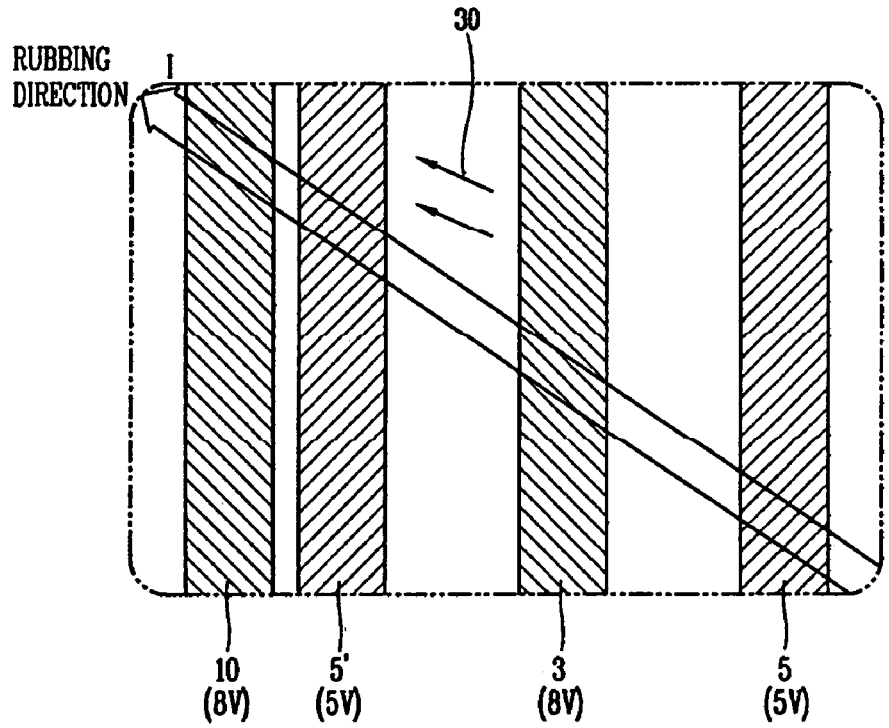
FIGS. 2A and 2B are enlarged views of a portion 'I' of FIG. 1 illustrating a distortion of the related art liquid crystal array due to a signal interference according to a voltage variation on the data line.
Figure 2B:
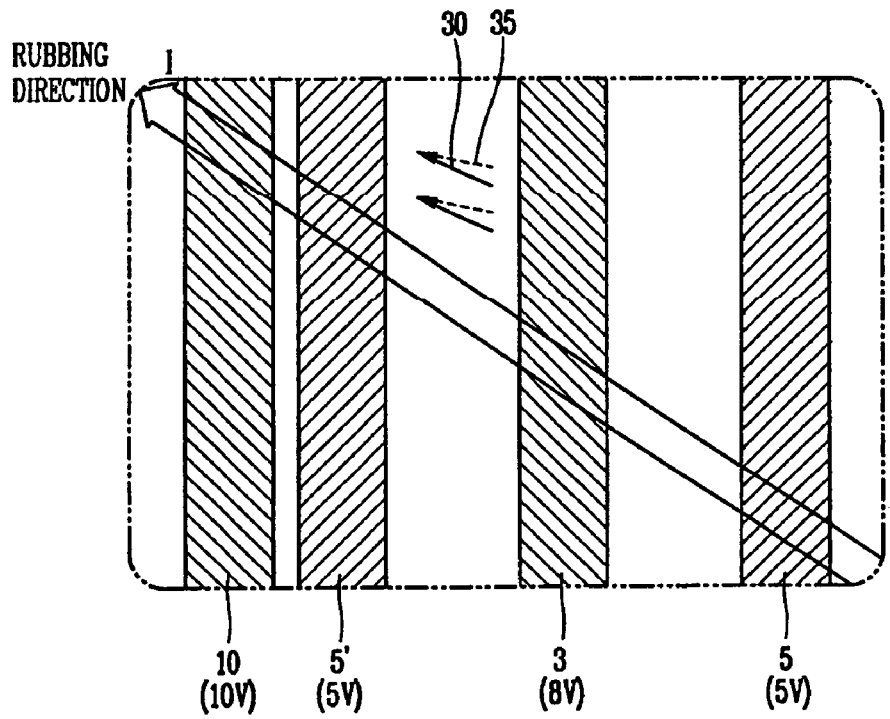
Figure 3:
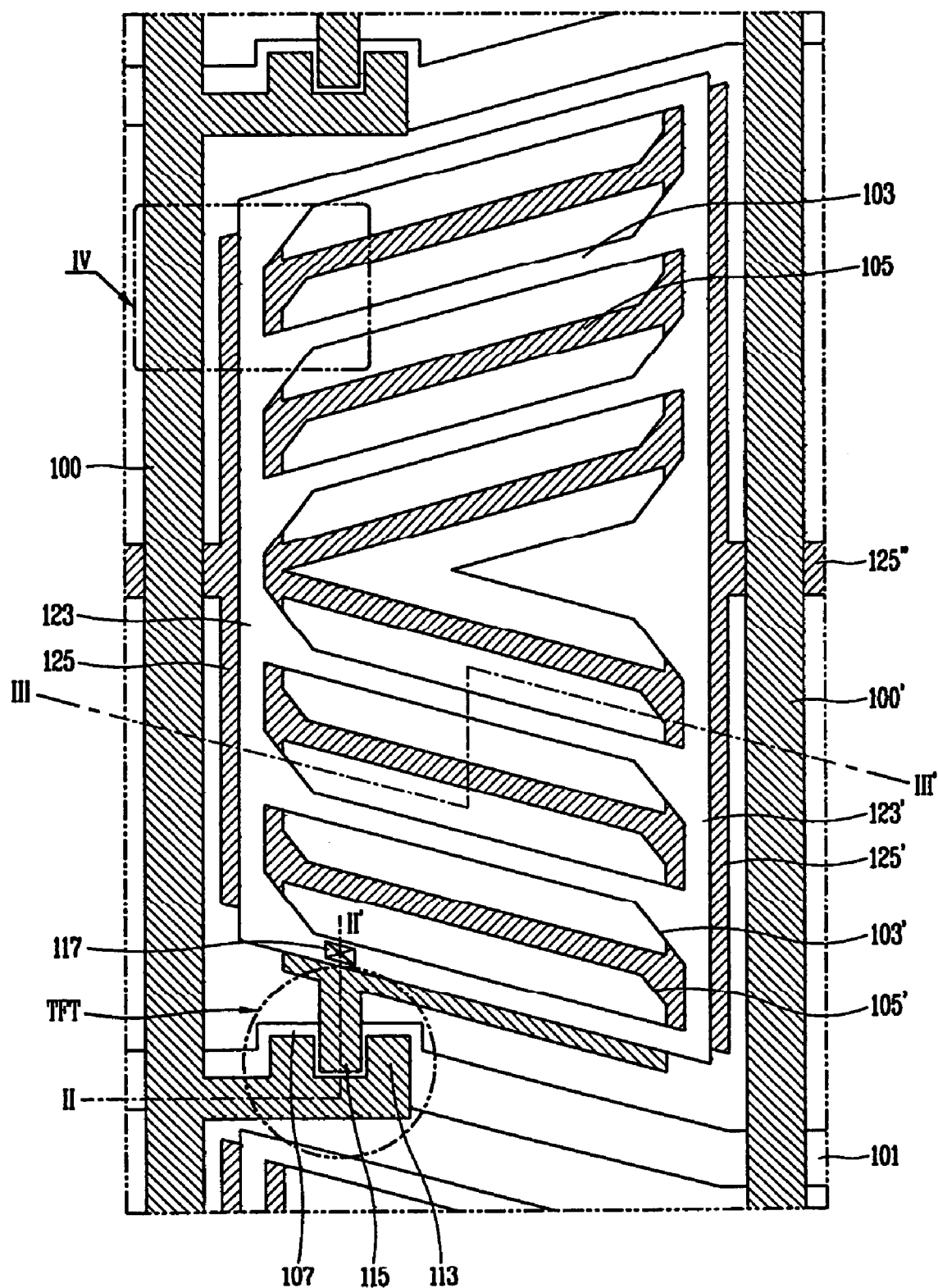
FIG. 3 shows an exemplary pixel region of an LCD device in accordance with a first embodiment of the present invention.
Figure 4A:
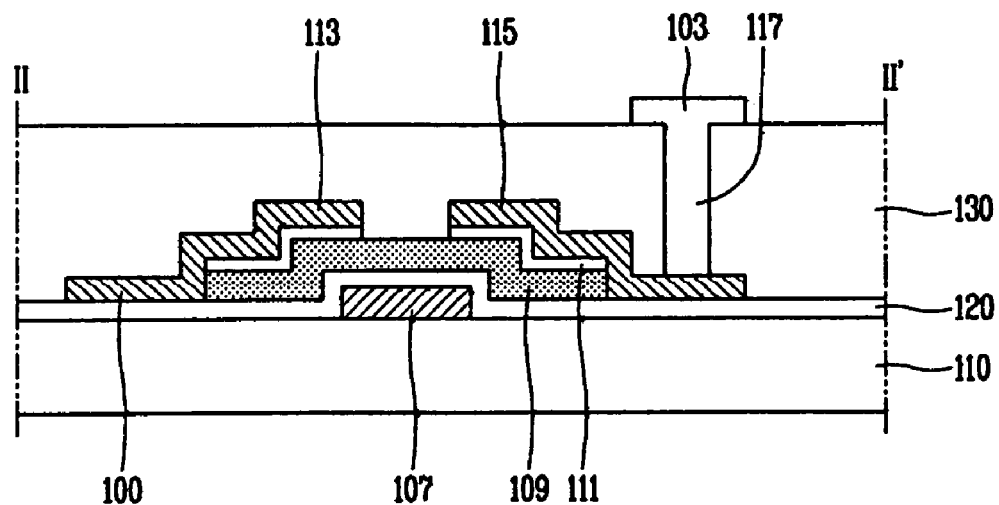
FIG. 4A is a cross-sectional view taken along line II-II' of FIG. 3.
Figure 4B:
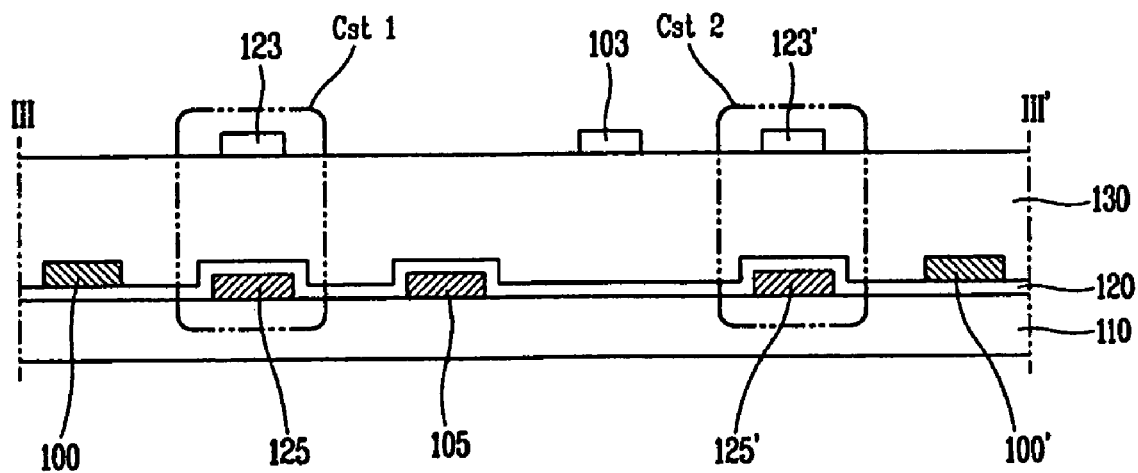
FIG. 4B is a cross-sectional view taken along line III-III' of FIG. 3.

FIG. 3 shows an exemplary pixel region of an LCD device in accordance with a first embodiment of the present invention. FIG. 4A is a cross-sectional view taken along line II-II' of FIG. 3. FIG. 4B is a cross-sectional view taken along line III-III' of FIG. 3. Referring to FIGS. 3, 4A and 4B, a liquid crystal panel includes a data line 100 and a gate line 101 arranged on a first substrate 110 and defining a pixel region, a switching device, such as a thin film transistor TFT, disposed at the crossing of the gate line 101 and the data line 100, and at least one pixel electrode 103 and one common electrode 105 alternately arranged in parallel to each other in the pixel region to generate a horizontal electric field. An alignment film (not shown) is formed on the first substrate 110 including the pixel electrode 103 and the common electrode 105. The alignment film is rubbed in the direction perpendicular to the data line 100. The pixel electrode 103 and the common electrode 105 are formed to have a tilt angle within a range of about 0°-45° with respect to a direction perpendicular to the data line 100 to correspond to the rubbing direction of the alignment film.

The switching device TFT includes a gate electrode 107 formed as a portion of the gate line 101 on the first substrate 110, a gate insulation film 120 formed on the gate electrode 107, a semiconductor layer 109, which is a channel region, formed on the gate insulation film 120, an ohmic contact layer 111 formed on the semiconductor layer 109, and a source electrode 113, which extends from the data line 100, and a drain electrode 115, which connects with the pixel electrode 103, formed on the ohmic contact layer 111. The source electrode 113 is spaced apart from the drain electrode 115. The gate insulation film 120 can be made of SiNx or SiOx, for example.

A passivation film 130 is formed over the entire switching device TFT. A pixel electrode 103 is formed over the passivation film 130. The pixel electrode 130 is electrically connected to the drain electrode 115 of the switching device TFT through a first contact hole 117 formed at the passivation film 130 to receive a data signal. The passivation film 130 can be made of SiNx or SiOx, for example. The pixel electrode 103 is a transparent conductor made of ITO (Indium Tin Oxide), IZO (Indium Zinc Oxide) or ITZO (Indium Tin Zinc), for example.

In the pixel region, a first pixel electrode line 123 is disposed in parallel with the data line 110. A second pixel electrode line 123' is disposed in parallel with a data line 100' of an adjacent pixel region in an extended direction of the gate line 101. A plurality of pixel electrodes 103 is electrically connected to the first and pixel electrode lines 123 and 123'.

A first common line 125 and a second common line 125' are formed at a lower portion of the first and second pixel electrode lines 123 and 123'. The plurality of common electrodes 105 are electrically connected to the first and second common lines 125 and 125'. The first common line 125 may be parallel with the data line 100. The second common line 125' may be parallel with the data line 100'. The first common line 125 overlaps the first pixel electrode line 123 and portions of the gate insulation film 120 and the passsivation film 130 interposed therebetween to form a first storage capacitor Cst1. The second common line 125' overlaps the second pixel electrode 123' and portions of the gate insulation film 120 and the passivation film 130 interposed therebetween to form a second storage capacitor Cst2.

The LCD device can also include a third common line 125" for applying a common signal to the first and second common lines 125 and 125'. In this case, the pixel electrode 103 and the common electrode 105 are symmetrically disposed with respect to an extended direction of the third common line 125" to form two domains in the pixel region.

In an embodiment of the present invention, the gate line 101 can be formed parallel to the adjacent pixel electrode 103 or common electrode 105, and can extend to form a zig-zag pattern on the entire liquid crystal panel. In another embodiment of the present invention, an adjacent pixel region can formed to be symmetrical to the pixel region shown in FIG. 3 with respect to the gate line 101. In still another embodiment of the present invention, an adjacent pixel region can also be formed to be symmetrical to the pixel region shown in FIG. 3 with respect to the data line 100 or the data line 100'. On a second substrate (not shown) corresponding to the first substrate 110, a light blocking layer, for example, a black matrix, for preventing leakage of light, a color filter layer consisting of color filters such as R, G and B, and an overcoat layer are sequentially formed.

Figure 4C:
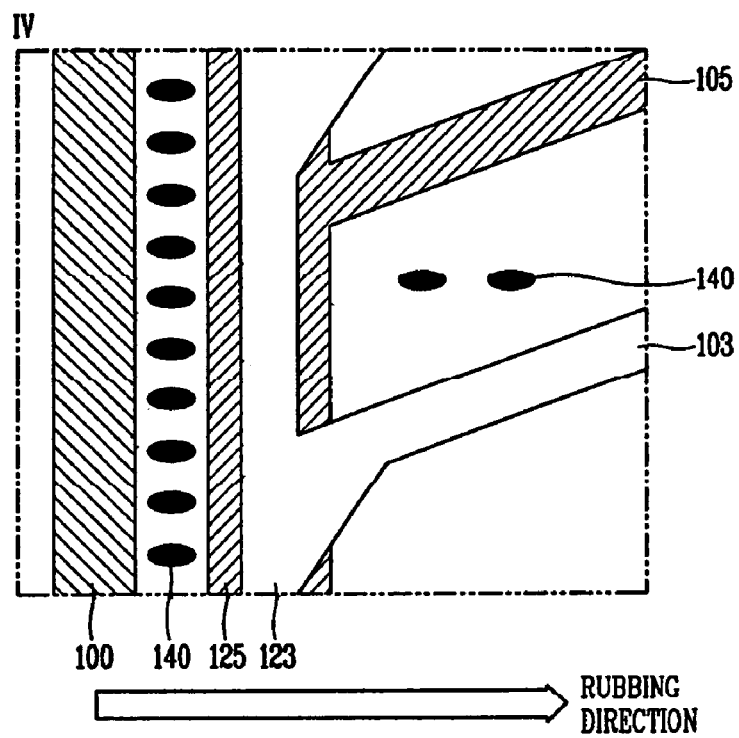
FIG. 4C is an enlarged view of a portion IV of FIG. 3, showing driving characteristics of liquid crystal molecules when no voltage is applied to the common and pixel electrodes.

FIG. 4C is an enlarged view of a portion IV of FIG. 3, showing driving characteristics of liquid crystal molecules when no voltage is applied to the common and pixel electrodes. In the related art LCD device, a rubbing is performed in a 45°-tilt direction with respect to the direction of the data line. In contrast, in an embodiment of the present invention, an alignment film (not shown) is formed on the first substrate 110 including the pixel electrode 103 and the common electrode 105. The alignment film is rubbed in the direction perpendicular to the data line 100. Thus, in an embodiment of the present invention, when no voltage is applied between the data line 100 and the first pixel electrode line 123, liquid crystal molecules 140 positioned between the data line 100 and the first pixel electrode line 123 are arranged in the direction perpendicular to the data line 100 and thus are not distorted by a residual voltage.

Figure 4D:
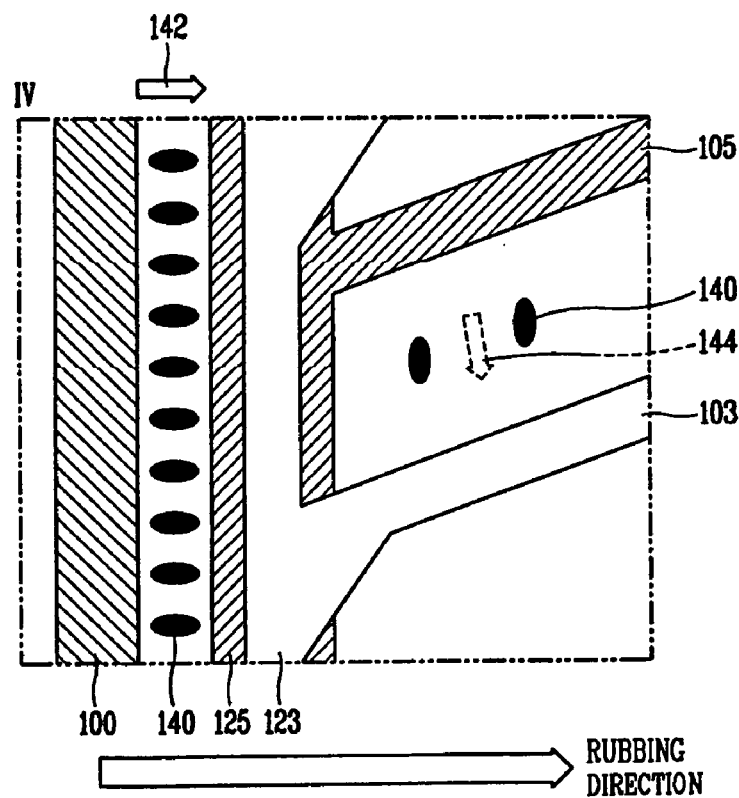
FIG. 4D is an enlarged view of a portion IV of FIG. 3, showing driving characteristics of liquid crystal molecules when a voltage is applied to the common and pixel electrodes.

FIG. 4D is an enlarged view of a portion IV of FIG. 3, showing driving characteristics of liquid crystal molecules when a voltage is applied to the common and pixel electrodes. As shown in FIG. 4D, in an embodiment of the present invention, when a voltage is applied between the data line 100 and the pixel electrode line 123, the rubbing direction inducing the initial arrangement of liquid crystal molecules is the same as the direction of a first electric field 142 between the data line 100 and the pixel electrode line 123. Specifically, when a voltage is applied between the common electrode 105 and the pixel electrode 103, the liquid crystal molecules 140 between the common electrode 105 and the pixel electrode 103 are arranged in the direction corresponding to the direction of a second horizontal electric field 144. In this case, because the first electric field 142 between the data line 100 and the first pixel electrode line 123 is formed in the direction perpendicular to the data line 100, the liquid crystal molecules 140 positioned between the data line 100 and the first pixel electrode line 123 do not move. In addition, the liquid crystal molecules 140 located between the common electrode 105 and the pixel electrode 103 are driven in the direction of the second electric field 144.

Accordingly, the rubbing direction of the-alignment film is made perpendicular to the data line 100, and the common and pixel electrodes 105 and 103, respectively, are disposed in accordance with the rubbing direction. In an embodiment of the present invention, the common and pixel electrodes 105 and 103 are tilted by an angle of about 45° with respect to the data line 100. Thus, distortion of the electric field due to the residual voltage of the data line 100 can be minimized and a twisting phenomenon of the liquid crystal molecules can be prevented. Moreover, light leakage at a corresponding region can be prevented even in a black-and-white mode.

However, a vertical dim phenomenon may occur in the LCD device due to a parasitic capacitance between the data line 100 and the pixel electrode 103. A second embodiment of the present invention is directed to an IPS mode LCD capable of enhancing picture quality of the liquid crystal panel, especially by removing the vertical line phenomenon.

Figure 5:
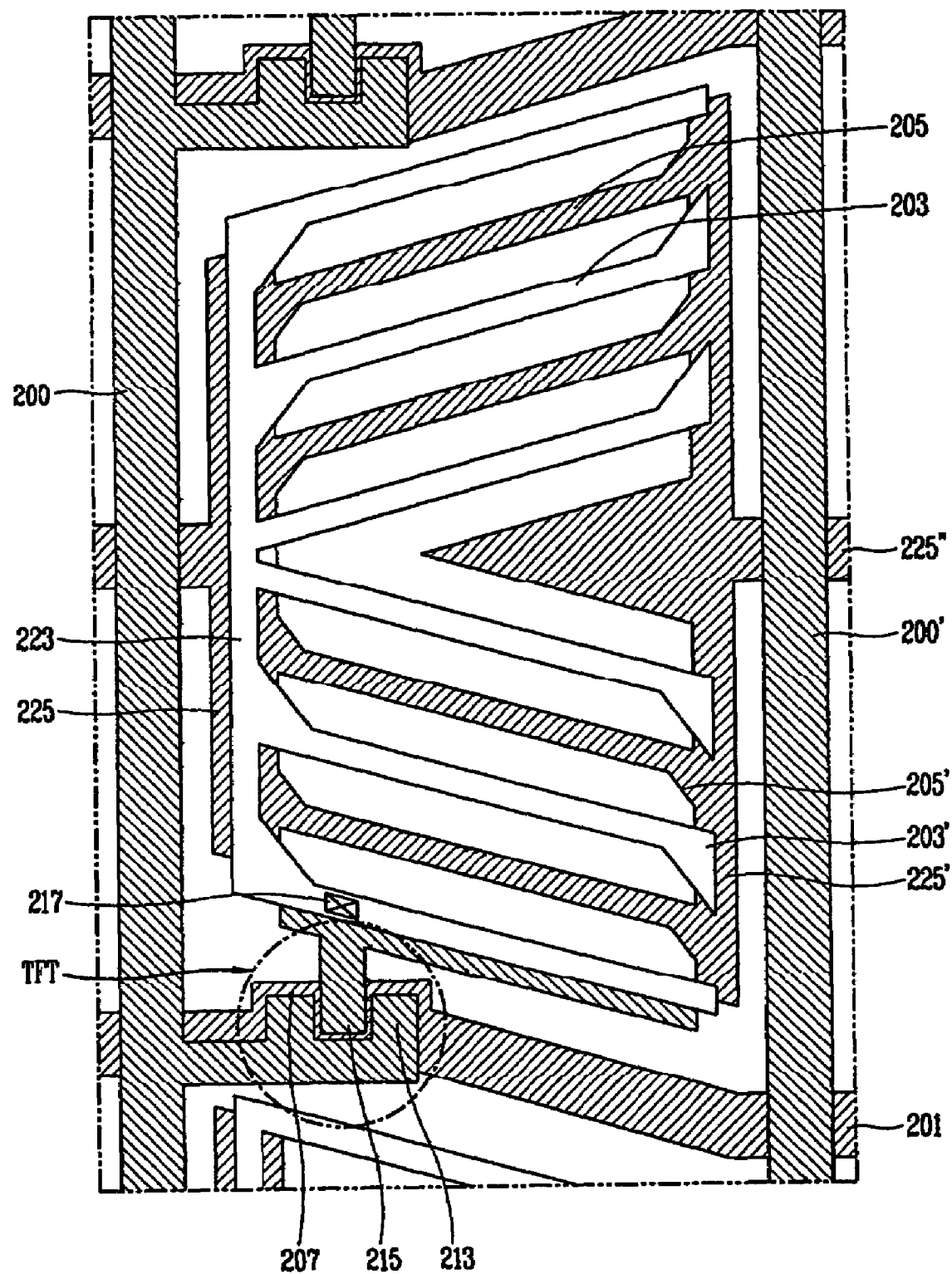
FIG. 5 shows an exemplary pixel region of an LCD device in accordance with a second embodiment of the present invention.

FIG. 5 shows an exemplary pixel region of an LCD device in accordance with a second embodiment of the present invention. The structure of the second embodiment of the present invention is similar to that of the first embodiment, so only different portions of the second embodiment will be described in further details. The same reference numerals in FIG. 5 refer to the same or like elements of the LCD device of FIG. 3. In the second embodiment of the present invention, the second pixel electrode line 123' (shown in FIG. 3) has been removed.

Referring to FIG. 5, a liquid crystal panel includes a data line 200 and a gate line 201 arranged on a first substrate (not shown) and defining a pixel region, a switching device TFT disposed at the crossing of the gate line 201 and the data line 200, and a plurality of pixel electrodes 203 and common electrodes 205 alternately arranged in parallel to each other in the pixel region and generating a horizontal electric field. An alignment film (not shown) is formed on the first substrate including the pixel electrodes 203 and the common electrodes 205. The alignment film is rubbed in the direction perpendicular to the data line 200. The pixel electrodes 203 and the common electrodes 205 are tilted by an angle within a range of about 0°-45° with respect to a direction perpendicular to the data line 200 to correspond to the rubbing direction of the alignment film.

The switching device TFT includes a gate electrode 207 formed as a portion of the gate line 201, a semiconductor layer (not shown), and a source electrode 213 and a drain electrode 215. The pixel electrodes 203 receive a data signal from the drain electrode 215 of the switching device TFT through a first contact hole 217 formed at an upper portion of the drain electrode 215.

In the pixel region, a pixel electrode line 223 from which the plurality of pixel electrodes 203 are protruded is disposed to be adjacent and in parallel to the data line 200 of the corresponding pixel. In contrast to the first embodiment of the present invention, in the second embodiment, the pixel electrode line 203 is formed only near the data line 200 defining the corresponding pixel, to separate the pixel electrodes 203 and the pixel electrode line 223 from the data line 200' of a neighbor pixel by a specific interval.

At both sides of the pixel region, the common electrodes 225 and 225' are disposed in parallel with the adjacent data lines 200 and 200' to connect the plurality of common electrodes 205. In this case, the common electrode line 225 adjacent to the data line 200 of the corresponding pixel overlaps the pixel electrode line 223 to form a storage capacitor. The common electrode line 225' adjacent to the data line 200' of an adjacent pixel shields a data signal of the adjacent pixel from the pixel electrode line 223 and the pixel electrodes 203. The pixel electrode line 223, the common line 225, the pixel electrodes 203 and the common electrodes 205 are made of a transparent conductor material, for example one of ITO (Indium Tin Oxide), IZO (Indium Zinc Oxide) and ITZO (Indium Tin Zinc), to increase the luminance of the LCD device.

In an embodiment of the present invention, the gate line 201 can be formed parallel to the adjacent pixel electrode 203 or common electrode 205, and can extend to form a zig-zag pattern on the entire liquid crystal panel. In another embodiment of the present invention, an adjacent pixel region can formed to be symmetrical to the pixel region shown in FIG. 3 with respect to the gate line 201. In still another embodiment of the present invention, adjacent pixel region can also be formed to be symmetrical to the pixel region shown in FIG. 3 with respect to the data line 200 or the data line 200'.

In accordance with the second embodiment of the present invention, the pixel electrode line 223 and the plurality of pixel electrodes 203 are isolated from the data line 200' of an adjacent pixel. A data signal on the adjacent data line 200' is shielded through the common electrode line 205. Accordingly, an influence of a parasitic capacitance according to the data line 200' is minimized. With such a structure, a luminance non-uniformity at each pixel resulting from a difference of the parasitic capacitance between adjacent pixels in the horizontal 2-dot driving method can be avoided.

FIGS. 6A and 6B show exemplary polarity patterns of a data signal supplied to a liquid crystal panel by a horizontal 2-dot inversion system. Referring to FIGS. 6A and 6B data polarity patterns are supplied to pixels of the liquid crystal panel according to a (2,1)-dot inversion system, with respect to an odd-numbered frame and an even-numbered frame, respectively. In the horizontal (2,1)-dot inversion driving method, as shown in FIG. 6A with regard to the odd-numbered frame, and as shown in FIG. 6B with regard to the even numbered frame, a data polarity pattern is changed after every two pixels or two dots, in the horizontal direction. The data polarity pattern is changed from one pixel to the next in the vertical direction. In another embodiment, in a horizontal (2,2)-dot inversion driving system (not shown), the data polarity pattern is changed after every two pixels or two dots, in the horizontal and vertical directions.

When the horizontal 2-dot inversion system is employed, a period of sequentially aligned R, G and B pixels corresponding to the polarity patterns of a data signal is 12 dots, horizontally. Thus, a DC voltage does not influence the data line on almost the entire screen, and thus, a flicker phenomenon can be reduced. However, when using the horizontal 2-dot inversion system, luminance difference occurs among pixels corresponding to odd number data line lines and even number data lines in a middle grey scale screen, causing the vertical line phenomenon. Specifically, the vertical line phenomenon is caused by a non-uniformity parasitic capacitance between the data line and the pixel electrode. This will now be described in detail as follows.

Figure 7:
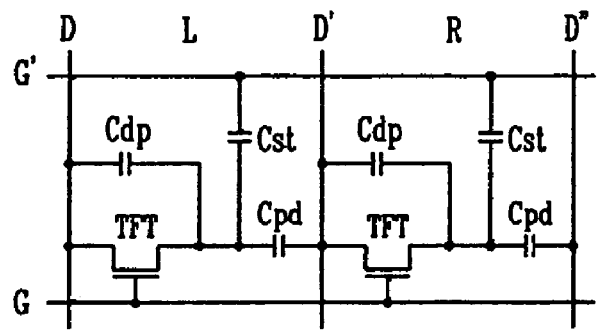
FIG. 7 is an exemplary circuit diagram corresponding to two horizontally adjacent pixels having the same polarity.

FIG. 7 is an exemplary schematic circuit diagram corresponding to two horizontally adjacent pixels having the same polarity. A pixel region of the LCD device includes a data line D, a gate line G, a switching device TFT formed at the crossing of the data line D and the gate line G, and a pixel electrode electrically connected with the switching device TFT. The switching device TFT includes a gate electrode electrically connected with the gate line G, a source electrode electrically connected with the data line D, and a drain electrode electrically connected with the pixel electrode.

When the switching device TFT receives a scan signal, for example, a gate high voltage (VGH), from the gate line G, the switching device TFT is turned on and transfers a data signal transmitted from the data line D to a pixel. When a gate low voltage (VGL) is supplied from the gate line G', the switching device TFT is turned off and maintains the data signal charged in the pixel. In order to stably maintain the data signal until a next data signal is charged in the pixel electrode, a storage capacitor (Cst) is provided at the pixel region. In general, the storage capacitor Cst is formed between a pixel electrode and the front stage gate line G'.

Referring to FIG. 7, parasitic capacitances are generated between the data lines D, D' and D'' and the pixel electrode in the pixel region. A first parasitic capacitance Cdp is generated between the left data line D and the pixel electrode. A second parasitic capacitance Cpd is generated between the pixel electrode and the right data line D'. After the data signal is charged in each pixel, the first and second parasitic capacitances Cdp and Cpd generate a variation of a voltage on the data line and change the voltage of the pixel due to capacitive coupling.

Figure 8:
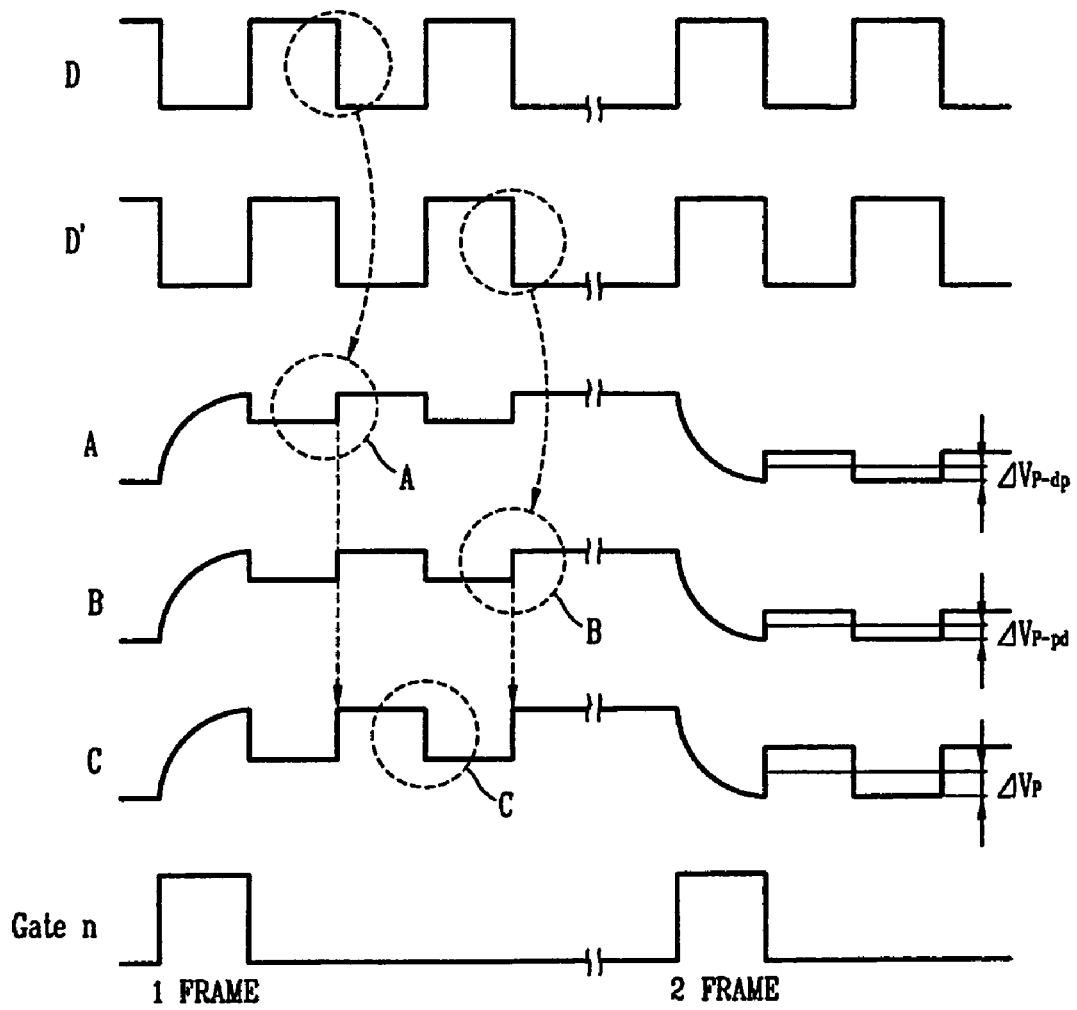
FIG. 8 illustrates signal waveforms showing a variation of a pixel voltage due to parasitic capacitance in a pixel of FIG. 7.

FIG. 8 illustrates signal waveforms showing a variation of a pixel voltage due to parasitic capacitance in a pixel of FIG. 7. Referring to FIGS. 7 and 8, two horizontally adjacent pixels L and R are driven by the horizontal 2-dot inversion system, so that the left pixel L and the right pixel R receive data signals having the same polarity of voltage from the data lines D and D', respectively. Then, the influence of an average variation value (ΔVp-dp) of a pixel voltage (A) due to the capacitance coupling of the first parasitic capacitance Cdp differs from the influence of an average variation value (ΔVp-pd) of a pixel voltage (B) due to the capacitance coupling of the second parasitic capacitance Cpd. The average variation value (ΔVp-dp) of the pixel voltage (A) caused by the capacitance coupling of the first parasitic capacitance Cdp and the average variation value (ΔVp-pd) of the pixel voltage (B) caused by the capacitance coupling of the second parasitic capacitance Cpd can be expressed by Equation 1 shown below:

$$\Delta Vp = \{Cdp \times \Delta V(DLm-1) + Cpd \times \Delta V(DLm)\} \div Ctotal \quad \text{(Equation 1)}$$

where Ctotal is an overall capacitance of the pixel electrode line.

Similarly, in the horizontal 1-dot inversion driving system, because the right pixel R has a data signal having an opposite polarity to that of the right adjacent pixel, a value of the first parasitic capacitance Cdp and a value of the second parasitic capacitance Cpd affect each other so that they are mutually offset. Comparatively, in case of the left pixel L, The average variation value (ΔVp-dp) of the pixel voltage (A) caused by the capacitance coupling of the first parasitic capacitance Cdp and the average variation value (ΔVp-pd) of the pixel voltage (B) caused by the capacitance coupling of the second parasitic capacitance Cpd are not mutually offset but added as shown in waveform (C) to cause a different influence from that of the right pixel R.

Figures 9A, 9B:
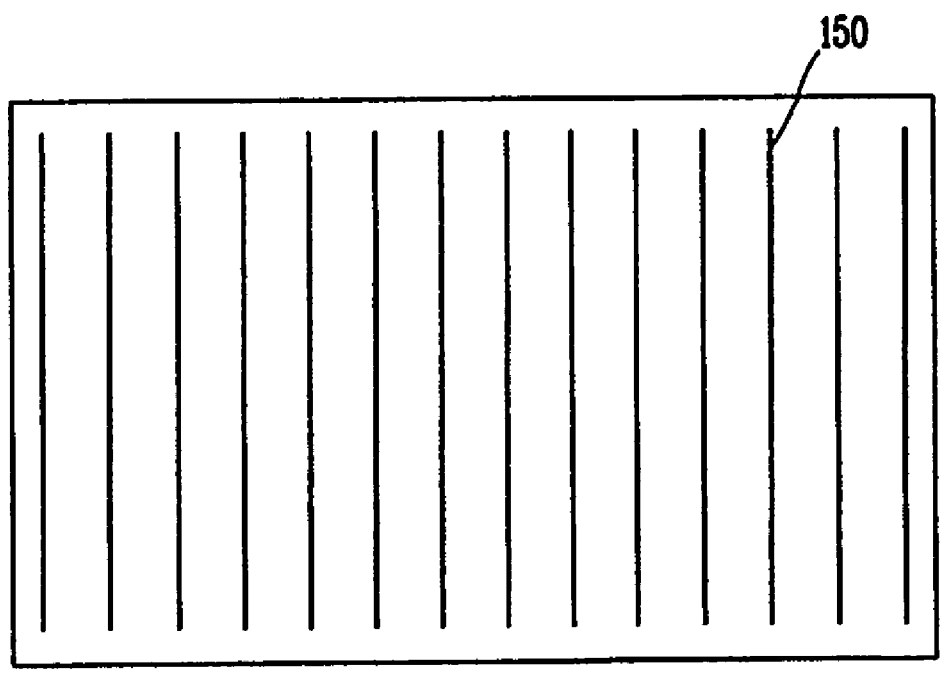
FIG. 9A shows data polarity patterns of a horizontal 2-dot inversion system applied to horizontally adjacent pixels on a liquid crystal panel.
FIG. 9B shows vertical lines appearing on the liquid crystal panel due to a capacitance coupling phenomenon caused by a parasitic capacitance of the LCD device.

FIG. 9A shows data polarity patterns of a horizontal 2-dot inversion system applied to horizontally adjacent pixels on a liquid crystal panel. FIG. 9B shows vertical lines appearing on the liquid crystal panel due to a capacitance coupling phenomenon caused by a parasitic capacitance of the LCD device. At the left pixel L, if the value of the first parasitic capacitance Cdp and the value of the second parasitic capacitance Cpd are the same, an effective value of the pixel voltage is changed by twice the value ΔVp-dp in comparison with the right pixel R. Thus, as shown in FIG. 9A, the right pixel R becomes brighter than the left pixel L. As a result, as shown in FIG. 9B, in the LCD device driven according to the horizontal 2-dot inversion driving method, the luminance difference among adjacent pixels L and R causes the appearance of vertical lines 150. Accordingly, in the second embodiment of the LCD in accordance with the present invention, in order to minimize the influence of the second parasitic capacitance in the pixel region, the first and second parasitic capacitances Cdp and Cpd are formed to be different in size, to thereby compensate for the luminance difference generated due to the non-uniform capacitance and thus prevent generation of the vertical line phenomenon.

As shown in FIG. 5, since the pixel electrode line 223 and the pixel electrodes 203 are separated from the data line 200' of the adjacent pixel region, the influence of the parasitic capacitance Cpd resulting from the data signal of the adjacent data line 200' can be minimized. Thus, the influence of capacitance coupling at the left pixel L and the right pixel R having the horizontally same polarity can be compensated and deviation of the pixel voltage of the left and right pixels can be offset. Thus, in the present invention, the vertical lines resulting from the difference in parasitic capacitance between the data line of each pixel and the pixel electrode do not appear.

Figure 10:
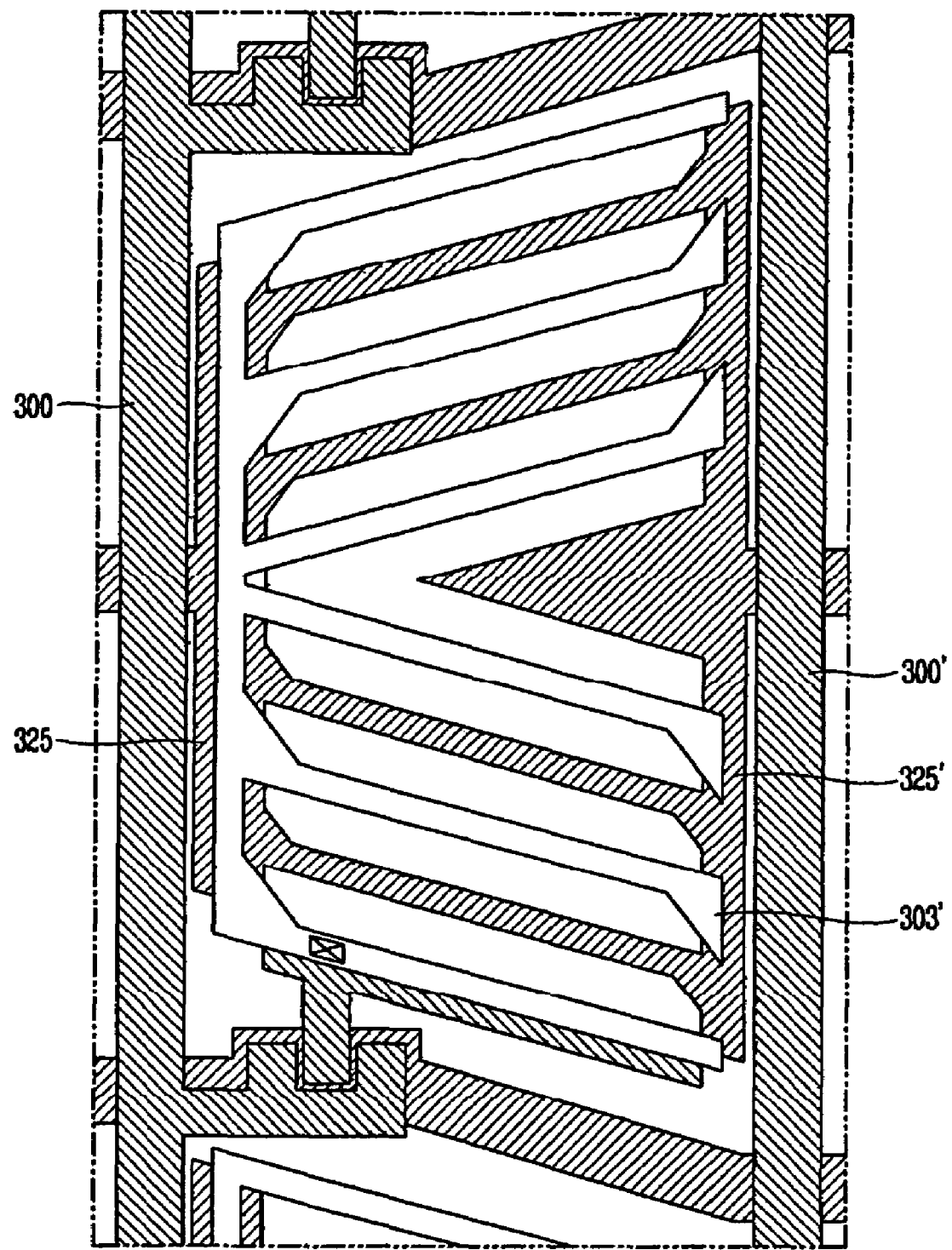
FIG. 10 shows an exemplary pixel region of an LCD device in accordance with a third embodiment of the present invention.

FIG. 10 shows an exemplary pixel region of an LCD device in accordance with a third embodiment of the present invention. The structure of the third embodiment of the present invention is similar to that of the second embodiment, so only different portions of the third embodiment will be described in further details. The same reference numerals in FIG. 10 refer to the same or like elements of the LCD device of FIG. 5.

Referring to FIG. 10, a first common line 325 and a second common line 325' are disposed at left and right sides of a pixel region to overlap adjacent data lines 300 and 300' within a range of about 1 μm or adjacently disposed to the data lines 300 and 300' with an isolation distance of up to about 30 μm. An interference by a data signal can be prevented by the first and second common lines 325 and 325' and non-uniformity of the parasitic capacitance (Cdp and Cpd) can be minimized. Thus, the vertical line phenomenon due to the non-uniformity of the parasitic capacitance (Cdp and Cpd) between the data line and the pixel line can be prevented. With such a structure, a block matrix process margin can be increased near the data lines 300 and 300'.

Figure 11:
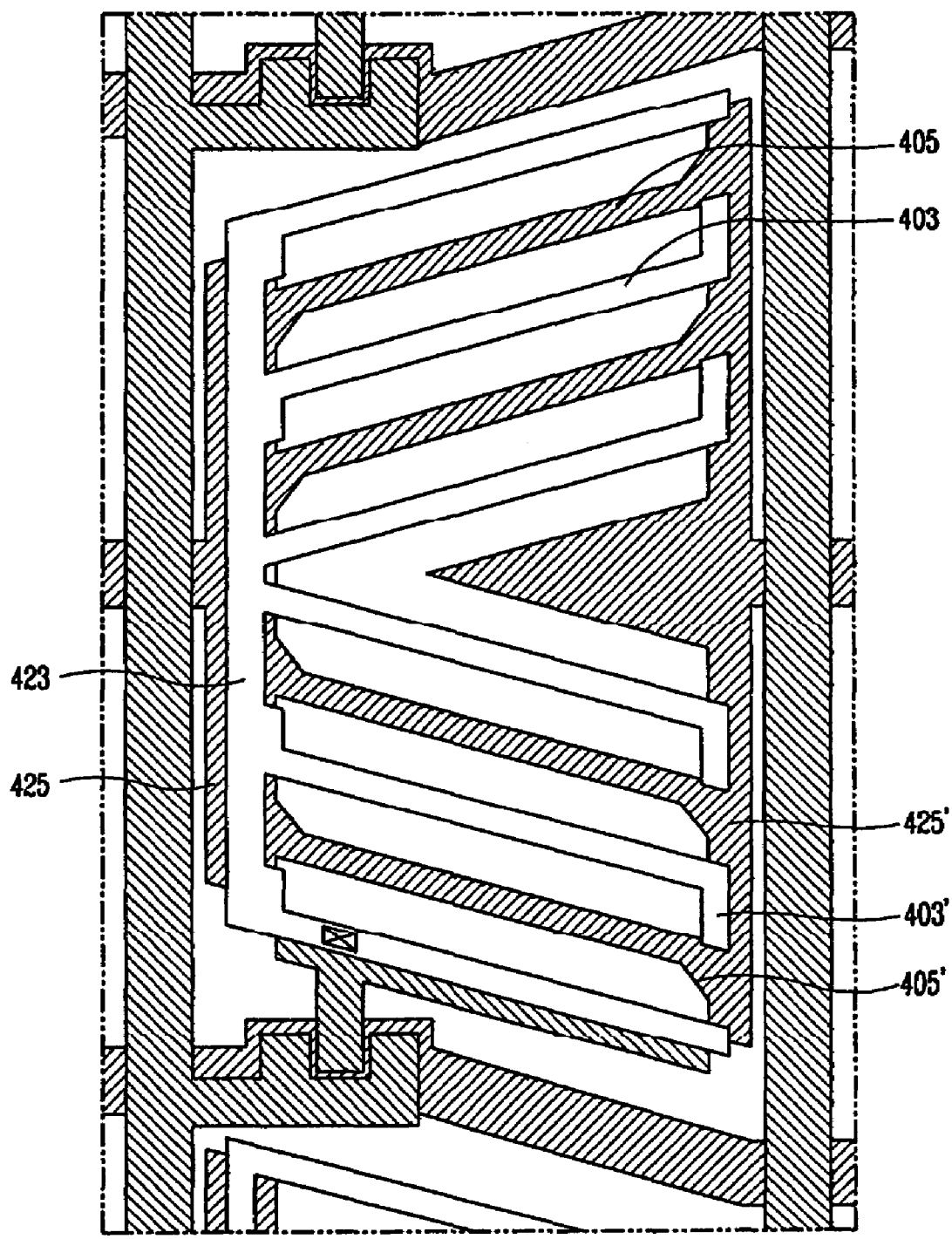
FIG. 11 shows an exemplary pixel region of an LCD device in accordance with a fourth embodiment of the present invention.

FIG. 11 shows an exemplary pixel region of an LCD device in accordance with a fourth embodiment of the present invention. The structure of the fourth embodiment of the present invention is similar to that of the second embodiment, so only different portions of the fourth embodiment will be described in further details. The same reference numerals in FIG. 11 refer to the same or like elements of the LCD device of FIG. 5.

Referring to FIG. 11, an auxiliary pixel electrode portion 403' is formed at both ends of the pixel electrode 403. An auxiliary common electrode portion 405' is formed at both ends the common electrode 405. The formation of auxiliary pixel electrode portions and auxiliary common electrode portions prevent generation of the disclination phenomenon due to distortion of electric field generated at a region where the same electrodes are electrically connected at an acute angle. As shown in FIG. 11, the auxiliary pixel electrode portion 403' is shaped as parallelogram.

In the fourth embodiment of the present invention, a parallelogrammic auxiliary pixel electrode portion 403' is formed on a region where the first and second common lines 425 and 425' are electrically connected with the common electrode 405 at an acute angle, and a triangular or parallelogrammic auxiliary common electrode portion 405' is additionally formed on a region where the pixel electrode line 423 is electrically connected with the pixel electrode 403 at an acute angle. With the parallelogrammic auxiliary pixel electrode portion 403' or the parallelogrammic auxiliary common electrode portion 405', an aperture ratio of the LCD device can be improved, compared with the triangular auxiliary pixel electrode portion 103', 203', and 303' as in the first to third embodiments of the present invention as described above. That is, since the area of the opening allowing liquid crystal molecules to be driven is substantially increased compared to the triangular electrode portion, the aperture ratio can be enhanced.

In accordance with the above-described embodiments of the present invention, the IPS mode LCD device provides many advantages. For example, since the rubbing direction is made perpendicular to the data line and the pixel electrode line, liquid crystal molecules positioned near the data line can maintain their initial alignment direction no matter whether a voltage is applied thereto. Thus, the liquid crystals are not twisted by a residual voltage on the data line in a voltage-OFF state, and light leakage can be prevented. In addition, picture quality can be enhanced by preventing a change of the perceived color due to signal distortion of the data line. Moreover, since the pixel electrode and the pixel electrode line are separated from the data line of an adjacent pixel region, the influence of a parasitic capacitance according to a data signal of the adjacent data line can be minimized in the horizontal 2-dot inversion driving method. Accordingly, no vertical lines appear on the display screen and the picture quality of the liquid crystal panel can be enhanced.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
a gate line formed on a first substrate;
first and second adjacent data lines crossing the gate line to form adjacent pixel regions in an extended direction of the gate line;
a pixel electrode line in parallel with the first data line in each of the pixel regions;
a plurality of pixel electrodes formed to be protruded in the extended direction of the gate line from the pixel electrode line;
a common line disposed in parallel with the first and second adjacent data lines, preventing cutting off a data signal;
a plurality of common electrodes alternately formed in parallel with the plurality of pixel electrodes and generating an in-plane electric field therebetween, the common electrodes being connected to the common line;
an auxiliary common electrode portion formed at both end portions of the common electrode to be protruded along an extended direction of the common line at a region where one of the common electrodes and the common line are connected, the auxiliary common electrode portion being formed at a lower portion of a region where the pixel electrode and the pixel electrode line are connected at an acute angle; and
an alignment film having a rubbing direction perpendicular to the first data line,
wherein the adjacent pixel regions are driven by a horizontal two-dot inversion system.

2. The liquid crystal display device of claim 1, wherein the pixel electrodes and the common electrodes are formed with a tilt angle within a range of about 0°-45° with respect to a direction perpendicular to the first data line.

3. The liquid crystal display device of claim 1, wherein the common line overlaps the first data line within a range of about 1 µm.

4. The liquid crystal display device of claim 1, wherein the common line overlaps a lower portion of the pixel electrode line, thereby forming a storage capacitor.

5. The liquid crystal display device of claim 1, wherein the common line transfers an externally provided common signal to the common electrodes.

6. The liquid crystal display device of claim 1, wherein the common line is formed with an isolation distance of up to about 30 µm from the first data line.

7. The liquid crystal display device of claim 1, further comprising:
an auxiliary pixel electrode portion formed at an upper portion of a region where one of the common electrodes and the common electrode line are connected at an acute angle.

8. The liquid crystal display device of claim 7, wherein the auxiliary pixel electrode portion has a triangular shape.

9. The liquid crystal display device of claim 7, wherein the auxiliary pixel electrode portion has a parallelogrammic shape.

10. The liquid crystal display device of claim 1, wherein the auxiliary common electrode portion has a triangular shape.

11. The liquid crystal display device of claim 1, wherein the auxiliary common electrode portion has a parallelogrammic shape.

12. The liquid crystal display device of claim 1, wherein the common electrodes and the pixel electrodes are symmetrical with respect to the common line, thereby forming two domains in the corresponding pixel region.

13. The liquid crystal display device of claim 1, wherein the gate line is formed in parallel with an adjacent common electrode or pixel electrode and extends in a zig-zag pattern.

14. The liquid crystal display device of claim 1, wherein the adjacent pixel regions are symmetrical with respect to the gate line.

15. The liquid crystal display device of claim 1, wherein the adjacent pixel regions are symmetrical with respect to the second data line.

16. The liquid crystal display device of claim 1, wherein the pixel electrodes are formed as a transparent conductor including of one of ITO (Indium Tin Oxide), IZO (Indium Zinc Oxide), and ITZO (Indium Tin Zinc).

17. The liquid crystal display device of claim 1, further comprising a thin film transistor formed at the crossing of the gate line and the first data line, wherein the thin film transistor includes a gate electrode, a semiconductor layer, a source electrode, a drain electrode, and a passivation layer.

18. The liquid crystal display device of claim 17, further comprising a first contact hole in the passivation layer for electrically connecting the drain electrode and the pixel electrodes.

* * * * *